(12) United States Patent
Boisselle et al.

(10) Patent No.: US 7,975,509 B2
(45) Date of Patent: Jul. 12, 2011

(54) GLASS BENDING PROCESS

(75) Inventors: Robert J. Boisselle, Maumee, OH (US);
Thomas G. Kleman, Graytown, OH (US); Daniel P. Lubelski, Rossford, OH (US)

(73) Assignee: Pilkington North America, Inc., Toledo, OH (US)

( * ) Notice: Subject to any disclaimer, the term of this patent is extended or adjusted under 35 U.S.C. 154(b) by 466 days.

(21) Appl. No.: 11/823,409

(22) Filed: Jun. 27, 2007

(65) Prior Publication Data
US 2009/0000334 A1 Jan. 1, 2009

(51) Int. Cl.
*C03B 11/00* (2006.01)
*C03B 11/07* (2006.01)

(52) U.S. Cl. ............................. 65/104; 65/106

(58) Field of Classification Search ............... 65/104, 65/106
See application file for complete search history.

(56) References Cited

U.S. PATENT DOCUMENTS

| | | | |
|---|---|---|---|
| 3,361,551 A * | 1/1968 | Reynolds | 65/25.1 |
| 4,043,782 A | 8/1977 | Bamford et al. | |
| 4,072,492 A * | 2/1978 | Castine, Jr. | 65/107 |
| 4,229,199 A * | 10/1980 | Seymour | 65/106 |
| 4,767,434 A | 8/1988 | Schwartz et al. | |
| 4,767,437 A | 8/1988 | Lampman et al. | |
| 5,114,454 A | 5/1992 | Promper et al. | |
| 5,292,356 A | 3/1994 | Herrington et al. | |
| 5,318,615 A | 6/1994 | Nagai et al. | |
| 5,735,922 A | 4/1998 | Woodward et al. | |
| 5,833,729 A | 11/1998 | Meunier et al. | |
| 5,857,358 A | 1/1999 | DeVries, Jr. et al. | |
| 5,882,370 A | 3/1999 | Garner et al. | |
| 5,928,398 A | 7/1999 | Lehto | |
| 5,938,810 A | 8/1999 | DeVries, Jr. et al. | |
| 5,974,834 A | 11/1999 | Rijkens et al. | |
| 5,992,178 A | 11/1999 | Kuster | |
| 6,009,726 A | 1/2000 | Funk | |
| 6,076,373 A | 6/2000 | Grodziski | |
| 6,240,746 B1 | 6/2001 | Maeda et al. | |

(Continued)

FOREIGN PATENT DOCUMENTS

FR 2852951 A1 * 10/2004

OTHER PUBLICATIONS

Machine translation of FR 2852951.*

*Primary Examiner* — Matthew J Daniels
*Assistant Examiner* — Cynthia Szewczyk
(74) *Attorney, Agent, or Firm* — Marshall & Melhorn, LLC

(57) ABSTRACT

A glass bending line for quickly shaping a complex bent glass sheet is provided that includes moving a ring-type female mold, which has a heated glass sheet placed on it, and a full face heated male mold, toward one another. Upon making shaping contact between the glass sheet and the male mold, a vacuum is applied through holes extending through the male mold, for a time sufficient to form the glass sheet to a desired shape. When the glass sheet has been shaped, the vacuum is terminated and pressurized air is connected to the holes to release the bent glass sheet from the male mold. The bent glass sheet is then quickly transported to a quenching station or an annealing station on a continuous conveying device. Hence, the complex bent glass sheet is achieved without the use of a shuttle ring.

21 Claims, 6 Drawing Sheets

U.S. PATENT DOCUMENTS

| | | |
|---|---|---|
| 6,318,125 B1 | 11/2001 | Diederen et al. |
| 6,357,263 B1 | 3/2002 | Yajima et al. |
| 6,385,999 B1 | 5/2002 | Silas |
| 6,578,384 B1 | 6/2003 | Peltonen |
| 6,705,116 B2 | 3/2004 | Matsuo et al. |
| 6,786,065 B2 | 9/2004 | Vehmas et al. |
| 7,024,889 B2 | 4/2006 | Nishitani et al. |
| 7,059,155 B2 | 6/2006 | Vehmas et al. |
| 2005/0061034 A1 | 3/2005 | Boisselle et al. |

* cited by examiner

GLASS BENDING PROCESS

FIELD OF THE INVENTION

The present invention relates to press bending of heated glass sheets.

BACKGROUND OF THE INVENTION

There are various press bending processes for forming bent glass sheets, particularly automotive glazings, wherein these processes function differently and which produce bent glass sheets of varying degrees of complexity of shape and of complexity associated with the types of bends.

Early press bending processes (see, for example, FIG. 1 that is similar to U.S. Pat. No. 4,043,782 to Bamford et al., which is incorporated herein by reference), typically include bending a heated glass sheet between a non-heated male mold and a female mold at relatively short cycle times. Upon being released from the male and female molds, the glazing is moved by way of transfer rollers to a subsequent step in the process, for example, glass quenching or annealing, which typically utilizes cooling gases.

Later press bending processes (see, for example, FIGS. 2-3 that are similar to U.S. Pat. No. 5,735,922 to Woodward et al., which is incorporated herein by reference), often include bending a heated glass sheet between a heated male mold and a ring-type female mold, wherein a vacuum may be drawn in holes and/or grooves (see, for example, U.S. Patent Application Publication No. 2005/0061034 to Boisselle et al. that is incorporated herein by reference), which are disposed through/on the male mold. Such vacuum is utilized to draw the heated glass sheet to a heated male mold shaping surface.

Subsequently, the vacuum is terminated when positive pressurized air is blown into the holes, in order to release a shaped glazing from the male mold. Upon being released from the male mold, the glazing is moved by way of a mechanical shuttle ring to a subsequent step in the process, for example, glass quenching (see, for example, FIGS. 2-3 and Woodward).

In comparison, the press bending processes like Bamford have, heretofore, been limited in the degree of complexity of shape and of complexity associated with the types of bends of which such processes are capable. On the other hand, the press bending processes like Woodward are capable of forming more complex bent glass sheets like windshields and some backlites. To their detriment, however, press bending processes, such as those disclosed in Woodward, require longer cycle times than press bending processes, such as those disclosed in Bamford, hence the processes, such as those disclosed in Woodward, typically result in higher manufacturing costs.

Recently, however, the automotive industry has increasingly been requiring more shape complexity and more complex types of bends for automotive glazings, while expecting improved optical quality, shape repeatability, and reduced finished product costs.

What is sought is a press bending process that reduces the cycle time (therefore, reducing the costs) necessary to produce automotive glazings with more complex types of bends, like windshields, sidelites, and backlites, similar to those formed in the press bending processes, such as those disclosed in Woodward, while exhibiting high optical quality and shape repeatability.

SUMMARY OF THE INVENTION

A process for shaping a heated glass sheet comprises providing a full face heated male mold having a shaping surface, which includes one or more holes therethrough, and providing a ring-type female mold beneath and in alignment with the heated male mold. Also, the process comprises positioning a heated glass sheet on the female mold and urging the male mold and the female mold toward one another to bring the heated glass sheet into shaping contact with the shaping surface of the heated male mold.

Further, the process comprises connecting at least one of the one or more holes in the shaping surface of the male mold to a negative pressure source, thereby drawing the glass sheet to the shaping surface of the male mold, and maintaining the connection with the negative pressure source for a time sufficient to form the heated glass sheet to a desired shape. The process further comprises terminating the connection to the negative pressure source, connecting at least one of the one or more holes in the shaping surface of the male mold to a positive pressure source to release the bent glass sheet from the male mold, urging the male mold and the female mold away from one another, allowing the bent glass sheet to come to rest on a continuous conveying device, and transferring the bent glass sheet away from the molds on the continuous conveying device.

This process is achieved without utilizing a shuttle ring, thus significantly improving glass shaping cycle times and yet providing a high optical quality bent glass sheet that possesses improved shape repeatability.

Further advantages of the present invention will be apparent from the following description and appended claims, reference being made to the accompanying drawings forming a part of a specification, wherein like reference characters designate corresponding parts of several views.

DETAILED DESCRIPTION OF THE INVENTION

It is to be understood that the patent drawings are not intended to define precise proportions of the elements of the invention but that the patent drawings are intended to be utilized in conjunction with the rest of the specification. Unless expressly specified to the contrary, it should also be understood that the illustrated differences between various elements of the invention, which may be in fractions of a unit of measurement, are not intended to be utilized to precisely measure those differences between the various elements.

Figure 1:
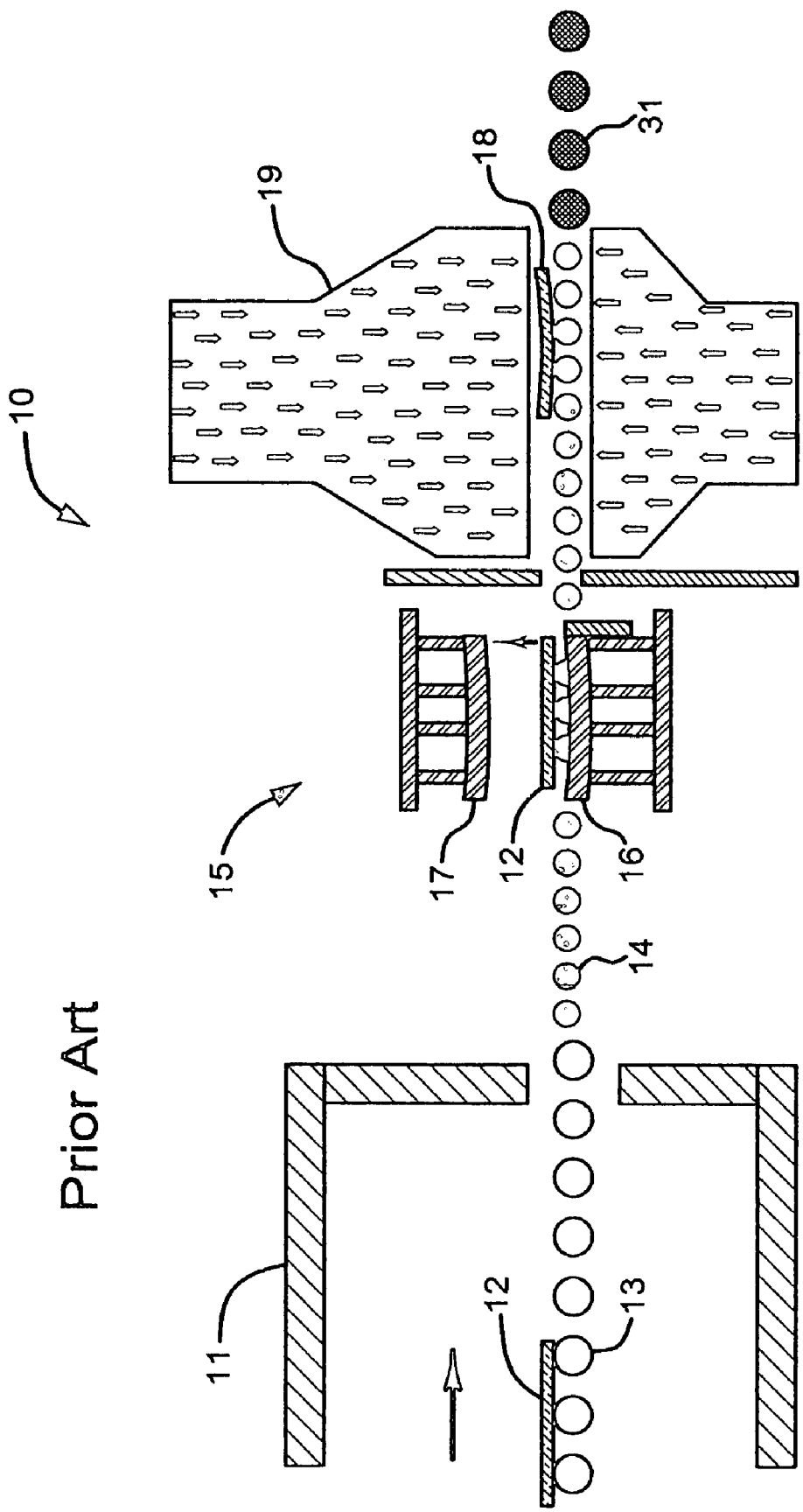
FIG. 1 is a plan schematic view of a press bending line in accordance with prior art similar to Bamford.

FIG. 1 is an illustration of a prior art glass press bending line 10 that is similar to Bamford, where a preheat furnace 11 heats glass sheets 12, which are transported on furnace rollers 13, in a direction shown by the arrow in the furnace 11. When the hot glass sheet 12 exits the preheat furnace 11, the hot glass sheet 12 is transported onto a continuous conveying device 14 (e.g., conveyor belts, flat rollers, contoured rollers, flat-to-contoured rollers, or various combinations thereof) and into a press bending station 15 where the glass sheet 12 is placed on a female mold 16. The female mold 16, which may be a full face mold or a ring-type mold, is shown in FIG. 1 to be in vertical alignment with a male mold 17 that is non-heated.

In the press bending station 15, the hot glass sheet 12 is brought into intimate contact with the male mold 17, by moving the female mold 16 up to the male mold 17, until the hot glass sheet 12 is molded into a bent glass sheet 18 (for example, an automotive sidelite or backlite). During formation, both molds 16,17 remain in intimate contact with the glass sheet 12.

Following its shaping by the two molding members 16,17, the bent glass sheet 18 is lowered by the female mold 16 to the continuous conveying device 14 (which may also be, for example, described as quenching rollers or annealing rollers) where the bent glass sheet 18 is transported to a subsequent processing station 19, for example, an air quenching station or an annealing station. As illustrated in FIG. 1, the processing station 19 utilizes cool positive pressurized air (as indicated by the up and down arrows directed toward the bent glass sheet 18 within the processing station 19) over the bent glass sheet 18, so as to, for example, thermally set the shape of the bent glass sheet 18 as it is transported through the processing station 19. However, the press bending line 10 produces bent glass sheets 18 that, typically, do not possess a high degree of shape complexity with more complex types of bends.

Upon completion of thermally setting the shape of the bent glass sheet 18 in the processing station 19, the bent glass sheet 18 is transported on take-away rollers 31 in the direction of the right pointing arrow above the rollers 31, at the exit of the processing station 19, as further illustrated in FIG. 1.

It is common for the press bending line 10 to form the bent glass sheet 18 relatively quickly and for the bent glass sheet 18 to continue to change shape as the bent glass sheet 18 is transported to and through the processing station 19. As a result, the press bending line 10 produces bent glass sheets 18 that may not attain as high a level of optical quality and/or shape repeatability as other glass shaping processes.

Figure 2:
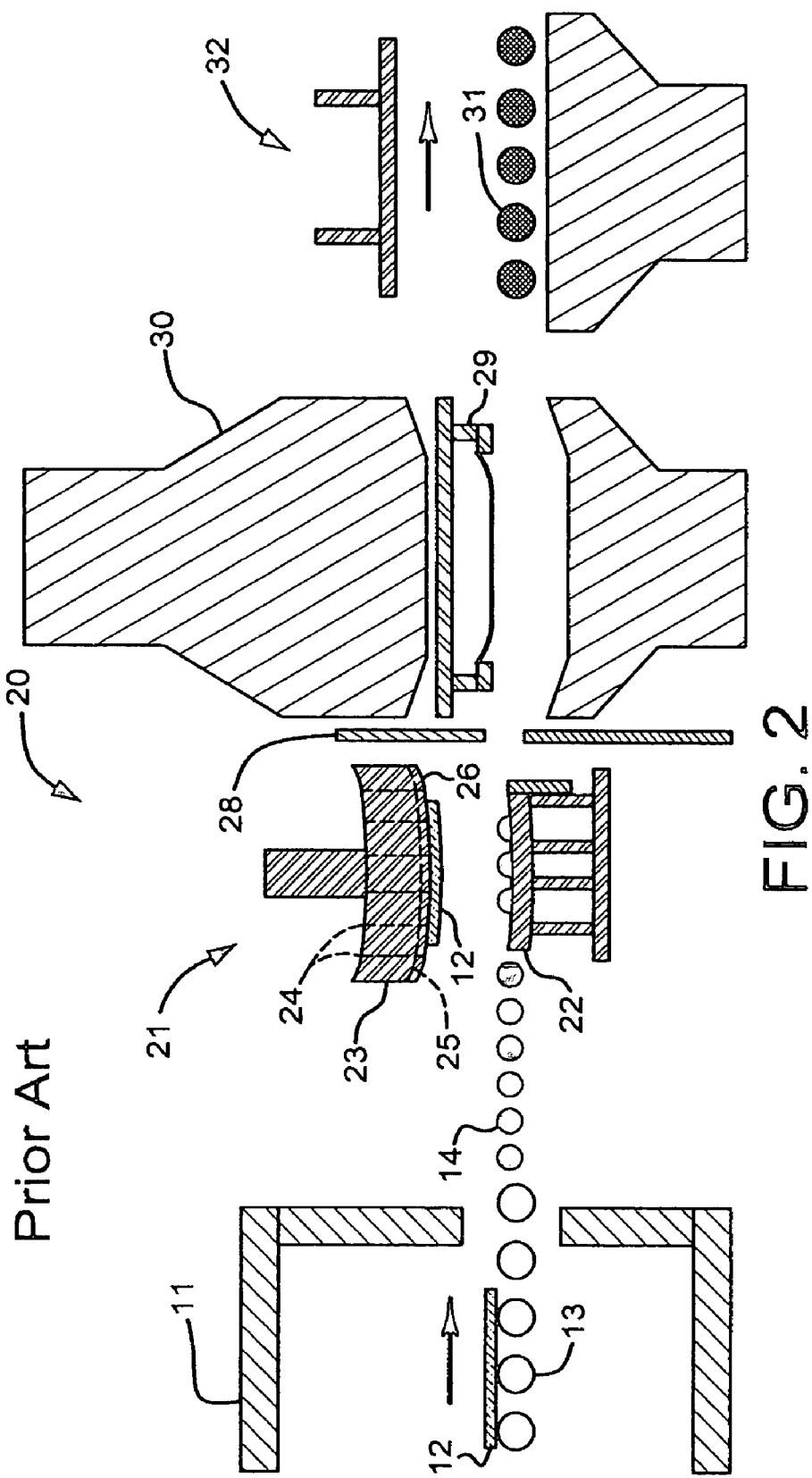
FIG. 2 is a plan schematic view of a press bending line in accordance with prior art similar to Woodward.

FIG. 2 is an Illustration of a prior art press bending line 20 that is similar to Woodward, where the preheat furnace 11 heats the glass sheet 12 and transports the hot glass sheet 12 on the furnace rollers 13 (in much the same way as the press bending line 10), in the direction shown by the right pointing arrow in the furnace 11. When the hot glass sheet 12 exits the preheat furnace 11, the hot glass sheet 12 is transported onto the continuous conveying device 14, much like the press bending line 10, and into a press bending station 21. In the press bending station 21, the hot glass sheet 12 is placed on a ring-type female mold 22, which is shown in vertical alignment with a full face heated male mold 23.

Further, the hot glass sheet 12 is typically brought into shaping contact with the male mold 23 by way of the female mold 22 being moved up to the male mold 23. Upon making initial shaping contact between the heated glass sheet 12 and the male mold 23, a vacuum is applied through vacuum holes 24, which extend from the male mold shaping surface through the male mold 23, and/or at least one perimeter vacuum groove 25 that is disposed on the shaping surface 26 of the male mold 23 (see, for example, Boisselle). The vacuum holes 24 and the vacuum groove 25 are connected to a source of negative pressure (i.e., vacuum source, not shown, but common in the art).

Figure 3:
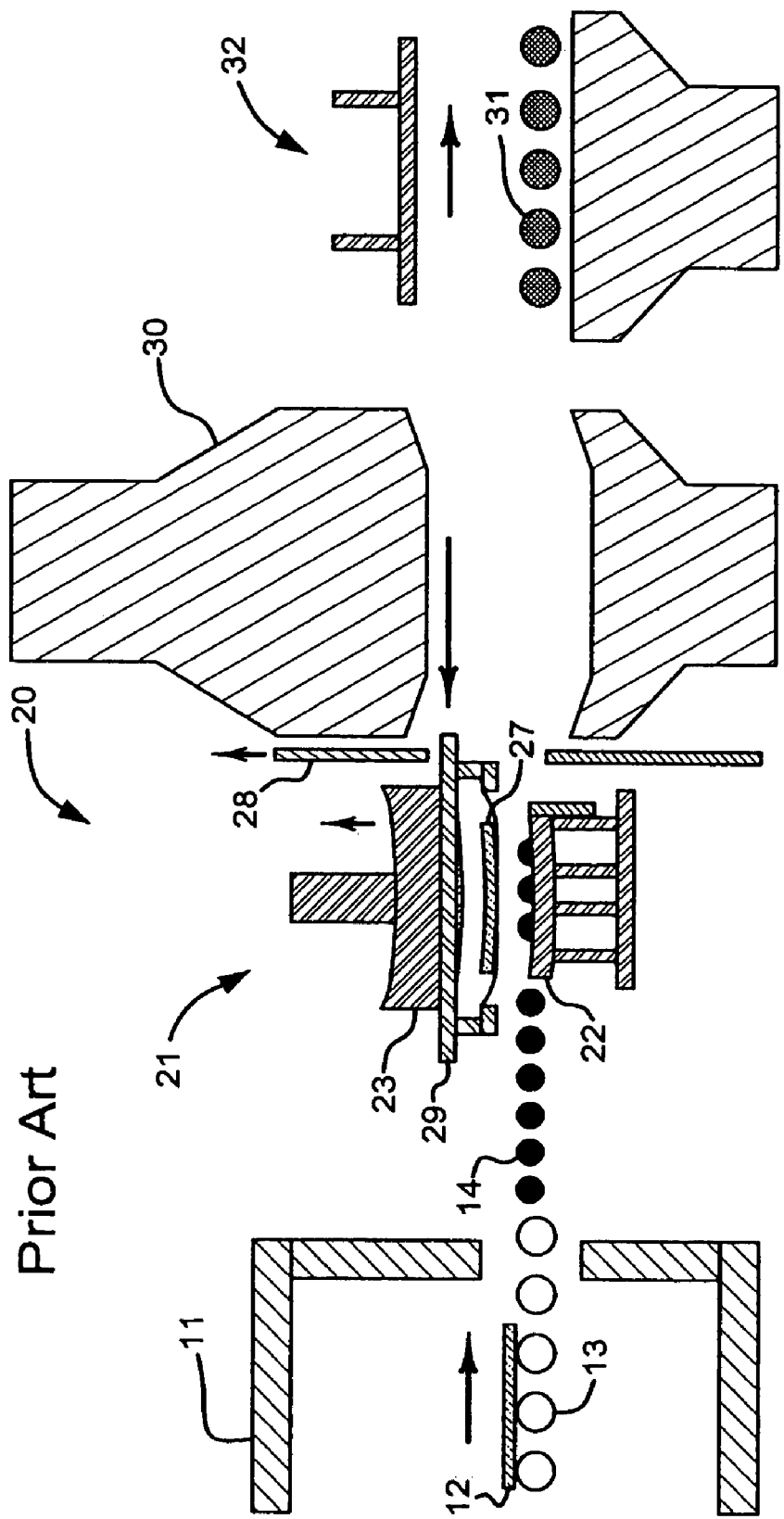
FIG. 3 is a plan schematic view of the prior art press bending line of FIG. 2 showing a shuttle ring having received a bent glass sheet from a male mold.

As a result of the vacuum, the hot glass sheet 12 is drawn into intimate conformity with the shaping surface 26 of the heated male mold 23, as illustrated in FIG. 2, and then the female mold 22 is lowered away from the male mold 23, wherein the hot glass sheet 12 remains attached to the heated male mold 23. Upon formation of a bent glass sheet 27, a partition 28 is raised (as shown by the up arrow above the raised partition 28 in FIG. 3), and a shuttle ring 29 (which is not considered to be a continuous conveying device like the continuous conveying device 14) is moved into a position below (as shown by the left pointing arrow in a processing station 30 as illustrated in FIG. 3) the bent glass sheet 27, while the bent glass sheet 27 remains in intimate conformity with the male mold 23. Next, the male mold 23, with attached bent glass sheet 27, is lowered toward the shuttle ring 29, where the vacuum is released in the holes 24 and the groove 25, and then, typically, air from a positive pressure source (not shown but common in the art) is connected to the holes 24, thus releasing the bent glass sheet 27 from the male mold shaping surface 26 and disposing the bent glass sheet 27 onto the shuttle ring 29 (see, for example, Woodward).

FIG. 3 is a prior art illustration, at a point in time in the press bending line 20 of FIG. 2, showing the partition 28 in the raised position and the shuttle ring 29 having been moved into a position that is below the male mold 23, but above the female mold 22, wherein the shaped bent glass sheet 27 has been released from the male mold 23 and disposed onto the shuttle ring 29. Consequently, the male mold 23 is in the process of returning to its shaping position (as shown by the up arrow above the male mold 23).

Although not shown, the shuttle ring 29 with the bent glass sheet 27 disposed thereon is subsequently moved to a position within the processing station 30. Hence, the processing station 30 circulates cool air around the bent glass sheet 27, in order to thermally set the shape of the bent glass sheet 27. The processing station 30 could be, for example, a quenching station or an annealing station.

Thus, the processing station 30 thermally sets the shape of the bent glass sheet 27, while cooperating with the shuttle ring 29. In order to achieve a more precisely set shape for the bent glass sheet 27, the cooling of the bent glass sheet 27 is controlled more carefully and extensively within the processing station 30, than within the processing station 19. One method used to accomplish this more precise and extensive cooling is to move the shuttle ring 29, with the bent glass sheet 27 disposed thereon, horizontally back and forth (not shown) within the processing station 30.

Upon completion of thermally setting the shape of the bent glass sheet 27 in the processing station 30, the bent glass sheet 27 is disposed onto take-away rollers 31, whereon the bent glass sheet 27 is transported in the direction of the right pointing arrow above the rollers 31, at a take-away station 32. This movement is illustrated in both FIGS. 2 and 3.

As a result, however, of transporting the bent glass sheet 27 into the processing station 30 by way of the shuttle ring 29 and more carefully controlling the extensive cooling of the bent glass sheet 27, the cycle time for the press bending line 20 is significantly longer than that of the press bending line 10, as the press bending line 10 is described herein. On the other hand, the press bending line 20 is capable of producing bent glass sheets that attain a high degree of shape complexity with more complex types of bends, for example, as required of automotive windshields and backlites, than the bent glass sheets 18 that are bent utilizing the press bending line 10.

Figure 4:
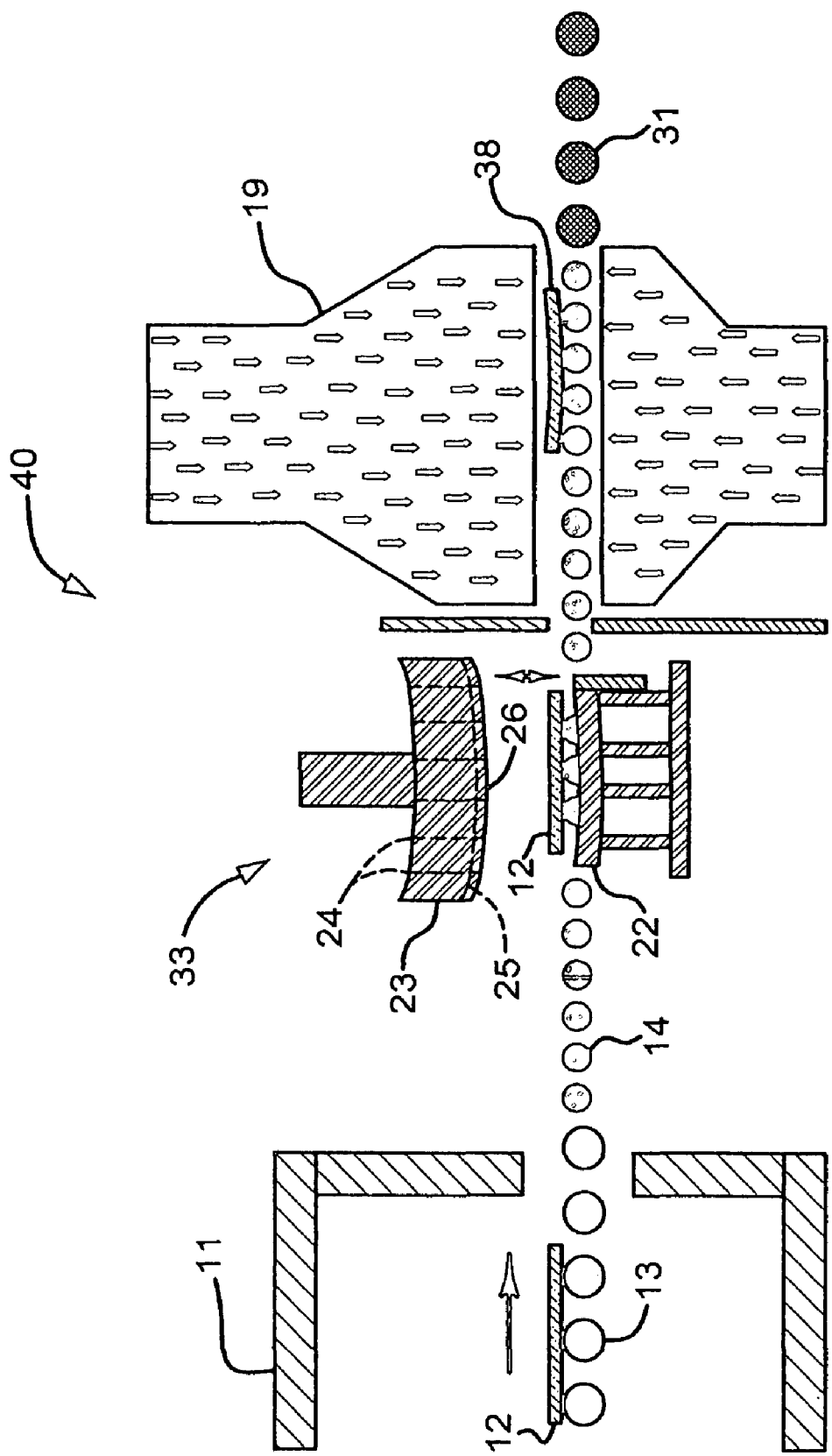
FIG. 4 is a plan schematic view of a press bending line in accordance with the present invention.

In accordance with the present invention, FIG. 4 illustrates a press bending line 40 where the preheat furnace 11 heats the glass sheet 12 and transports the hot glass sheet 12 on the furnace rollers 13, in much the same way as the press bending line 10 and in the direction shown by the right pointing arrow in the furnace 11. However, after the hot glass sheet 12 exits the preheat furnace 11, the hot glass sheet 12 is transported by way of the continuous conveying device 14 and into a press bending station 33, where the hot glass sheet 12 is placed on the ring-type female mold 22, for example, by moving the female mold 22 up into contact with the heated glass sheet 12.

The ring-type female mold 22 is shown in vertical alignment with the full face heated male mold 23, whose shaping surface 26 is precisely maintained at a temperature, for example, in the range of 300-400° C. for male mold surfaces that comprise ceramic or stainless steel and in the range of 180-340° C. for male mold surfaces that comprise aluminum, while in shaping contact with the heated glass sheet 12.

In the press bending station 33, the hot glass sheet 12 is brought into shaping contact with the heated full face male mold 23, by way of the ring type female mold 22 and the male mold 23 being urged toward each other or by way of the female mold 22 or the male mold 23 being urged toward the other (see in FIG. 4 the up-down arrow between the two molds 22,23). Upon making initial shaping contact between the heated glass sheet 12 and the male mold 23, a vacuum (i.e., negative pressurized air or other gas) is applied through the vacuum holes 24, which extend from the male mold shaping surface 26 through the male mold 23, and/or at least one perimeter vacuum groove 25 that is disposed on the shaping surface 26 of the male mold 23. The holes 24 and groove 25 may be physically/pneumatically connected to one another.

As a result of the application of the vacuum, the hot glass sheet 12 is drawn to the shaping surface 26 of the heated male mold 23 and then the molds 22,23 may be urged away from one another (e.g., the female mold 22 may be lowered to a position below the continuous conveying device 14 or the female mold 22 may be retracted between 1-9 mm). It has been found that by lowering/retracting the female mold 22 from the male mold 23 with the heated glass sheet 12 attached, certain complex bent and shaped glazings can be better formed than when the female mold 22 stays in intimate contact with the male mold 23, with the heated glass sheet 12 attached.

Also, it may be necessary to lower/retract the female mold 22 in order to avoid "ballooning" of the center portion of a bent glass sheet 38, when positive air pressure is later applied through the holes 24 and/or groove(s) 25 to release the bent glass sheet 38. The "ballooning" of the glass sheet 38 may be more likely when the female mold 22 remains in contact with the male mold 23, with the attached bent glass sheet 38.

In a preferred embodiment of the invention, it is proposed that the surface of each of the molds 22,23 be covered with at least one air-permeable cloth, which is preferably made of, for example, stainless steel, fiber glass, poly para-phenylene-terephthalamide fibers (e.g., Kevlar™), materials blended with Kevlar™, polybenzoxazole (PBO) fibers containing graphite (e.g., Zylon™), or various weaves of these fibers. The use of such air permeable cloth helps to distribute the vacuum uniformly over the glass contact surfaces of the bending tools 22,23 (see, for example, Boisselle).

If the female mold 22 has been lowered below or out of the way of the continuous conveying device 14, then, upon formation of the bent glass sheet 38, the heated male mold 23 may lower the attached bent glass sheet 38 toward the continuous conveying device 14 and release the vacuum in the holes 24 and the groove 25. Then, a gas (for example, air) is blown into the holes 24, thus releasing the bent glass sheet 38 from the male mold shaping surface 26 and allowing the bent glass sheet 38 to come to rest on the continuous conveying device 14.

If the female mold 22 has stayed in contact with the male mold 23 and the attached bent glass sheet 38, then, upon formation of the bent glass sheet 38, the vacuum is released in the holes 24 and the groove 25, and the gas is blown into the holes 24, thus releasing the bent glass sheet 38 from the male mold shaping surface 26 and positioning the bent glass sheet 38 on the female mold 22. Subsequently, the female mold 22 lowers the bent glass sheet 38 and positions the bent glass sheet 38 on the continuous conveying device 14.

If the female mold 22 has been retracted from the male mold 23 and the attached bent glass sheet 38, then, upon formation of the bent glass sheet 38, the vacuum is released in the holes 24 and the groove 25 and the gas is blown into the holes 24, thus releasing the bent glass sheet 38 from the male mold shaping surface 26 so as to allow the bent glass sheet 38 to come to rest on the female mold 22 (which may be approximately 1-9 mm below the bent glass sheet 38). Subsequently, the bent glass sheet 38 is positioned by the female mold 22 on the continuous conveying device 14.

It may be appreciated that the three above-described lowering/releasing means, associated with positioning the bent glass sheet 38 on the continuous conveying device 14, do not require a shuttle ring 29, as the lowering/releasing means of the bent glass sheet 27 of FIGS. 2-3.

Subsequent to the positioning of the bent glass sheet 38 on the continuous conveying device 14, the continuous conveying device 14 quickly transports the bent glass sheet 38 to the processing station 19 which could be, for example, an air quenching station or an annealing station. Upon completion of thermally setting the shape of the bent glass sheet 38 in the processing station 19, the bent glass sheet 38 is quickly transported to the take-away rollers 31 in the direction of the right pointing arrow above the rollers 31 in FIG. 4.

It is preferred that after the hot glass sheet 12 (where a thin sheet 12 is considered to have a thickness that is less than 2.5 mm and a thick sheet 12 is considered to have a thickness that is equal to or more than 2.5 mm) exits the preheat furnace 11, the instant invention a) may precisely control a first predetermined time delay interval (which is greater than zero, for example, 0.1 to 1.0 seconds) after the heated glass sheet 12 is initially brought into shaping contact with the shaping surface 26 of the heated male mold 23, but before connecting one or more holes 24 (and/or grooves 25) in/on the shaping surface 26 of the heated male mold 23 to the negative pressure source, b) may maintain the connection between the holes 24 and the negative pressure source for a time interval sufficient (for example, 0.8 to 3.0 seconds for thin hot glass sheets 12 but up to 5.0 seconds for thick hot glass sheets 12) to form the heated glass sheet 12 to a desired shape and then terminate the connection to the negative pressure source, and/or c) may precisely control a second predetermined time delay interval (which is greater than zero, for example, 0.1 to 1.0 seconds) after the connection to the negative pressure source has been terminated, but before connecting the one or more holes (and/or grooves 25) in/on the shaping surface 26 of the male mold 23 to a positive pressure source to release the bent glass sheet 38 from the male mold 23. At least these criteria result in improvements of the press bending line 40 over the other press bending lines 10,20.

Although FIG. 4 illustrates a single press bending line 40, it is conceivable that two or more of such lines 40 could be producing bent glass sheets 38 together, while utilizing various combinations of at least preheat furnaces 11, press bending stations 33 (including molds 22,23), processing stations 19, and conveying means 13,14,31.

Also, reduced cycle time, in the order of a 30% improvement, as compared to the press bending line 20, is obtained by directly transporting the bent glass sheet 38 on the continuous conveying device 14 (preferably at high speed), thus eliminating the need for the shuttle ring 29 and the associated handling and cooling operations that are associated with the utilization of the shuttle ring 29.

It has also been found that the press bending line 40 results in providing high optical quality bent glass sheets 38 like windshields, front and rear sidelites (for example, 1.6 mm, 1.8 mm, and 2.1 mm thick sidelite pairs), quarter windows, sun roofs, venting windows, and backlites, which possess improved shape repeatability over known press bending lines like the press bending line 10.

By applying the vacuum to the heated glass sheet 12 in the press bending line 40, the glass sheet 12 better takes the shape of the heated full face male mold 23. In addition, because the male mold 23 is precisely heated, the glass sheet 12 can be kept in more precise shaping contact with the male mold 23, which allows for better shape control over the press bending line 10.

It has also been found that the press bending line 40 is not as negatively impacted by various anomalies that may affect known press bending lines like that of the press bending line 10. For example, the impact of changes in glass temperature through the full extent of the line 40, tooling expansion/contraction as the tooling gets hotter/cooler, and uncontrolled gaps in the flow of glass sheets 12 have a diminished negative affect on the quality of the glazings produced by the instant invention.

Further, it is preferred that in making the male mold 23 (which may comprise, for example, a ceramic, aluminum, a stainless steel material, or other materials) non-adjustable (for example, making the male mold surface 26, which may be covered with a cloth, non-adjustable) to production personnel (thereby minimizing operator error), improvements in shape repeatability are further obtained. Also, the above-stated precise heating of the male mold 23 and the precise shaping time intervals can result in better utilization of such a non-adjustable male mold. Tooling costs are also reduced in the press bending line 40, because of the elimination of the shuttle ring 29 and the elimination of a take away station 32 that are required in the press bending line 20.

Precision control of the conformity of the heated glass sheet 12, by applying the time interval to form the heated glass sheet to the desired shape, can result in better perimeter and interior shape control in the press bending line 40, when compared to the press bending line 10. Also, when the continuous conveying device 14 is modified (where exact contour rollers shapes are dependent on the individual bent glass sheets 38 being produced) the transportation of the heated glass sheet 12 to the female ring mold 22 allows for pre-bending of the heated glass sheet 12.

The above-mentioned time periods may also significantly improve the shape repeatability, improve control over cross curvature, improve overall process control during and after conformity to the heated glass mold 23, reduce thermal expansion during start up of the process lines, minimize unwanted sagging of the heated glass sheet 12, and improve optical quality of the bent glass sheet 38.

Further, the continuous conveying device 14 may maintain the shape of, or further slightly shape, the bent glass sheet 38, while quickly transporting the bent glass sheet 38 to the processing station 19.

As a result of an implementation of the press bending line 40, several production builds of bent glass sheets 38 (see the "spider chart" of FIG. 6) were compared, for the same glazing and under similar conditions, to bent glass sheets 18 (see the "spider chart" of FIG. 5) from the conventional press bending line 10. Specifically, each build consisted of several hundred glazings, where off form dimensional measurements around the periphery of the bent glass sheets 18,38 were taken. Each peripheral point plotted in FIGS. 5-6 corresponds to a one standard deviation dimensional measurement, which is measured in millimeters. For example, the 0.55 data point at MSR17 in FIG. 5 is taken to mean that at one standard deviation a measurement of 0.55 mm resulted.

Figure 5:
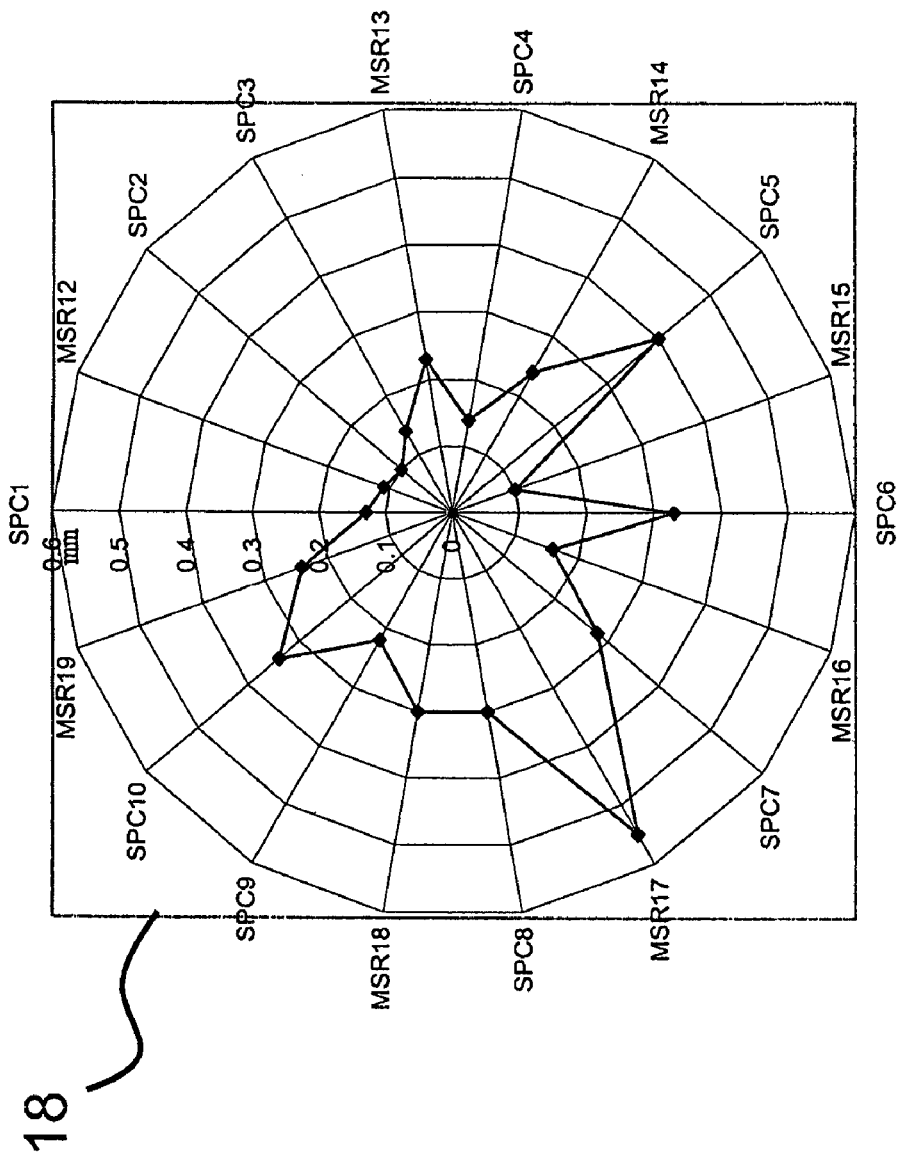
FIG. 5 is a chart of dimensional standard deviation of glass sheets produced in accordance with prior art disclosed in Bamford.
Figure 6:
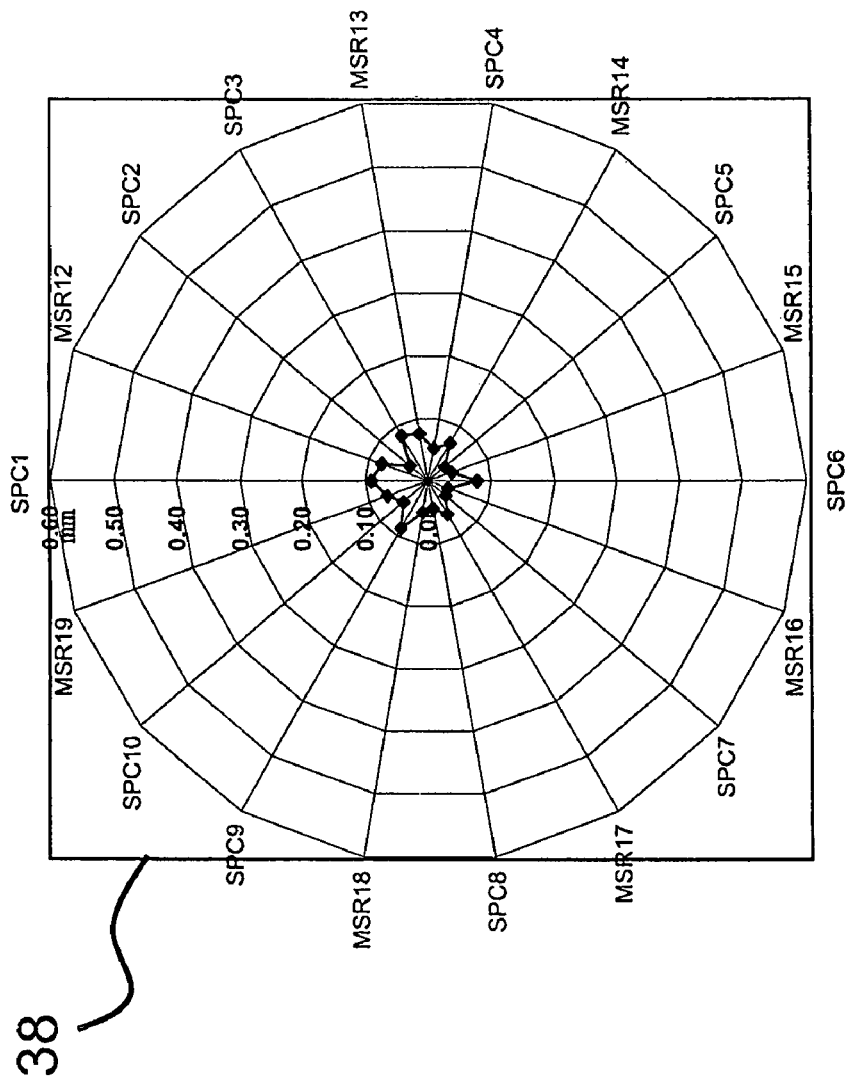
FIG. 6 is a chart of dimensional standard deviation of glass sheets produced in accordance with the present invention.

Thus, FIG. 5 illustrates that the conventional press bending line 10 resulted in dimensional variations from 0.1 to 0.55 mm with an average standard deviation of 0.23 mm. On the other hand, FIG. 6 illustrates that the present invention press bending line 40 resulted in dimensional variations that were all less than 0.1 mm with an average standard deviation of 0.05 mm. In other words, the press bending line 40 showed an approximate 75% reduction in average standard deviation dimensional variation, over the press bending line 10.

In accordance with the provisions of the patent statutes, the principles and modes of operation of this invention have been described and illustrated in its preferred embodiments. However, it must be understood that the invention may be practiced otherwise than as specifically explained and illustrated without departing from its spirit or scope.

What is claimed is:

1. A process for shaping a heated glass sheet comprising:
   a. providing a full face heated male mold having a shaping surface heated to a temperature between 180° C. and 400° C., the shaping surface including one or more holes therethrough;
   b. providing a ring-type female mold beneath and in alignment with the heated male mold;
   c. positioning a heated glass sheet on the female mold;
   d. urging the male mold and the female mold toward one another to bring the heated glass sheet into shaping contact with the shaping surface of the heated male mold;
   e. connecting at least one of the one or more holes in the shaping surface of the male mold to a negative pressure source, thereby drawing the glass sheet to the shaping surface of the male mold;
   f. maintaining the connection with the negative pressure source for a time sufficient to form the heated glass sheet to a desired shape and then, terminating the connection to the negative pressure source;
   g. urging the male mold and the female mold away from one another;
   h. delaying release of the bent glass sheet from the male mold for 0.1 to 1.0 seconds before connecting at least one of the one or more holes in the shaping surface of the male mold to a positive pressure source, thereby allowing the bent glass sheet to come to rest on the female mold so as to release the bent glass sheet from the male mold;
   i. lowering the bent glass sheet on the female mold until the bent glass sheet is positioned on a continuous conveying device; and
   j. transferring the bent glass sheet away from the molds on the continuous conveying device.

2. The process for shaping a heated glass sheet of claim 1, further comprising lowering the male mold with the attached bent glass sheet toward the continuous conveying device and lowering the female mold below the continuous conveying device.

3. The process for shaping a heated glass sheet of claim 1, wherein step g is comprised of retracting the female mold from the heated glass sheet between 1-9 mm and later lowering the female mold with the bent glass sheet supported thereon.

4. The process for shaping a heated glass sheet of claim 1, wherein step h is comprised of lowering the female mold with the bent glass sheet supported thereon.

5. The process for shaping a heated glass sheet of claim 1, including at least one annular groove in the shaping surface of the male mold and connecting the at least one annular groove to the pressure sources.

6. The process for shaping a heated glass sheet of claim 1, further comprising transporting the bent glass sheet on the continuous conveying device to a quenching station.

7. The process for shaping a heated glass sheet of claim 1, further comprising transporting the bent glass sheet on the continuous conveying device to an annealing station.

8. The process for shaping a heated glass sheet of claim 1, wherein the continuous conveying device comprises at least one of conveyor belts, contoured rollers, flat rollers, gradually flat-to-contoured rollers, and a combination thereof.

9. The process for shaping a heated glass sheet of claim 1, further comprising thermally setting the shape of the bent glass sheet comprising one of a windshield, a front sidelite, a rear sidelite, a quarter window, a sun roof, a venting window, or a backlite.

10. The process for shaping a heated glass sheet of claim 1, wherein the male mold comprises at least one of ceramic, aluminum, or stainless steel.

11. The process for shaping a heated glass sheet of claim 1, wherein the male mold surface comprises a cloth that is non-adjustable.

12. The process for shaping a heated glass sheet of claim 11, wherein the cloth is air-permeable comprising at least one of stainless steel, fiber glass, poly para-phenyleneterephthalamide fibers or blends thereof, polybenzoxazole (PBO) fibers containing graphite, and various weaves of these fibers.

13. The process for shaping a heated glass sheet of claim 1, wherein the shaping surface of the male mold comprises at least one of ceramic or stainless steel maintained at a temperature between 300 and 400° C., while the male mold is in shaping contact with the glass sheet.

14. The process for shaping a heated glass sheet of claim 1, wherein the shaping surface of the male mold comprises aluminum maintained at a temperature between 180 and 340° C., while the male mold is in shaping contact with the glass sheet.

15. The process for shaping a heated glass sheet of claim 1, wherein the heated glass sheet is initially brought into shaping contact with the shaping surface of the male mold for a predetermined time interval in a range of 0.1 to 1.0 seconds.

16. The process for shaping a heated glass sheet of claim 1, wherein the time sufficient to form the heated glass sheet to the desired shape is in a range of 0.8 to 3.0 seconds for glass sheets having a thickness up to 2.5 mm and in a range of 3.0 to 5.0 seconds for glass sheets having a thickness from 2.5 to 5.0 mm.

17. A process for shaping a heated glass sheet comprising:
providing a full face heated male mold having a shaping surface, the shaping surface including one or more holes therethrough;
providing a ring-type female mold beneath and in alignment with the heated male mold;
positioning a heated glass sheet on the female mold;
urging the male mold and the female mold toward one another to bring the heated glass sheet into shaping contact with the shaping surface of the heated male mold for 0.1 to 1.0 seconds;
connecting at least one of the one or more holes in the shaping surface of the male mold to a negative pressure source, thereby drawing the glass sheet to the shaping surface of the male mold, and maintaining the connection with the negative pressure source for 0.8 to 5.0 seconds to sufficiently form the heated glass sheet to a desired shape, and then terminating the connection to the negative pressure source;
urging the male mold and the female mold away from one another;
after connecting the holes to the negative pressure source, delaying release of the bent glass sheet from the male mold for 0.1 to 1.0 seconds before connecting the at least one of the one or more holes in the shaping surface of the male mold to a positive pressure source, thereby allowing the bent glass sheet to come to rest on the female mold;
lowering the female mold with the bent glass sheet supported thereon until the glass sheet is positioned on a continuous conveying device; and
transferring the bent glass sheet away from the molds on the continuous conveying device;
wherein the shaping surface of the male mold is maintained at a temperature between 180 and 400° C., while the male mold is in shaping contact with the glass sheet.

18. The process for shaping a heated glass sheet of claim 17, further comprising including at least one annular groove in the shaping surface of the male mold and connecting the at least one annular groove to the pressure sources.

19. The process for shaping a heated glass sheet of claim 17, further comprising thermally setting the shape of the bent glass sheet comprising one of a windshield, a front sidelite, a rear sidelite, a quarter window, a sun roof, a venting window, or a backlite.

20. The process for shaping a heated glass sheet of claim 17, wherein the male mold comprises at least one of ceramic, aluminum, or stainless steel.

21. The process for shaping a heated glass sheet of claim 17, wherein the molding surface of the male mold is non-adjustable.

* * * * *